UNITED STATES PATENT OFFICE.

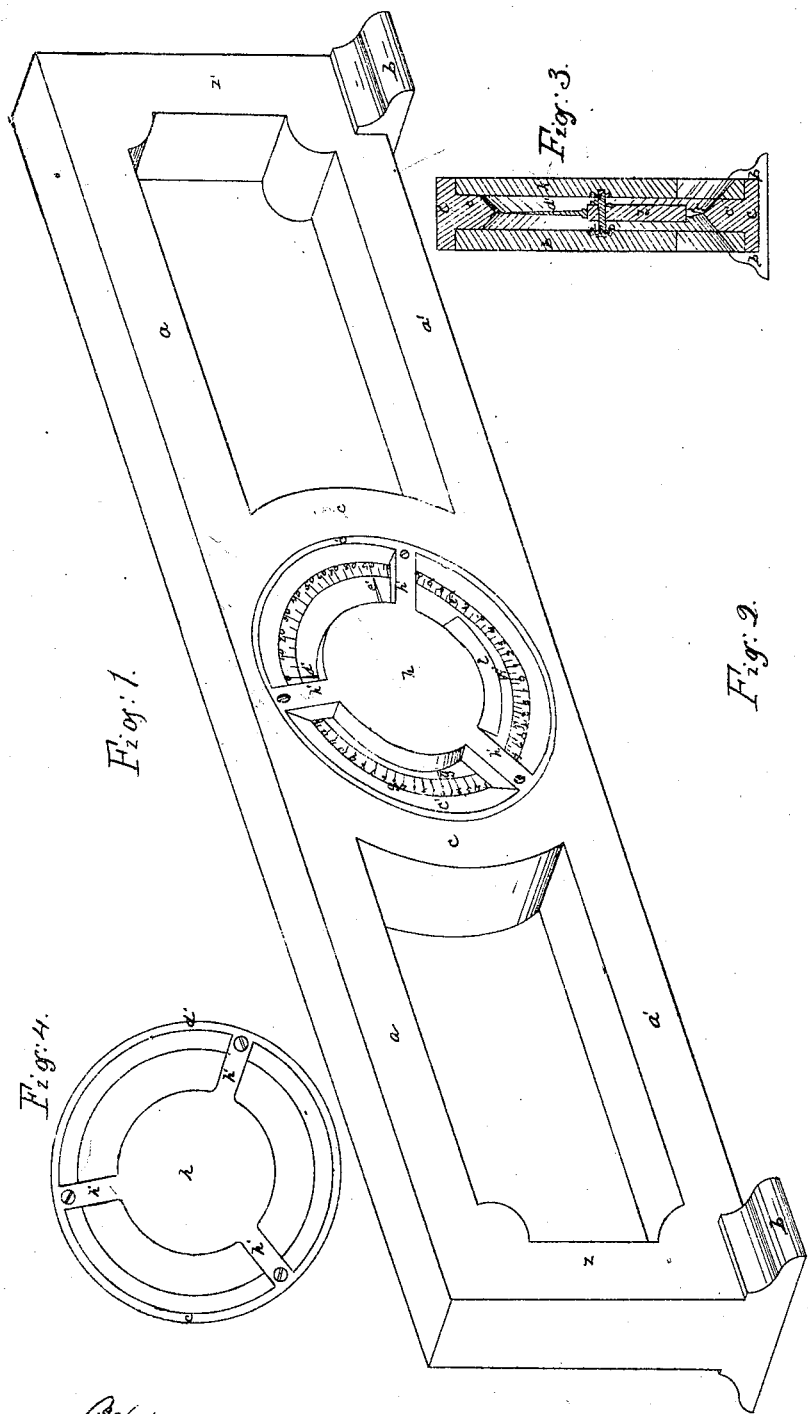

JOHN L. L. KNOX, OF PITTSBURG, PENNSYLVANIA.

IMPROVEMENT IN CLINOMETERS AND LEVELS.

Specification forming part of Letters Patent No. 72,740, dated December 31, 1867.

*To all whom it may concern:*

Be it known that I, JOHN L. L. KNOX, of the city of Pittsburg, in the county of Allegheny and State of Pennsylvania, have invented a new and useful Improved Clinometer and Level; and I do hereby declare the following to be a full, clear, and exact description thereof, reference being had to the accompanying drawings, making a part of this specification, in which—

Figure 1 is a perspective view of my improvement. Fig. 2 is a side view of the same, with the front cap of the index-box removed. Fig. 3 is a vertical cross-section in the line $xx$, Fig. 2; and Fig. 4 is a side or face view of the box and cap.

Like letters of reference indicate like parts in each.

The nature of my invention consists in the construction of an improved clinometer, plumb, and level, so made and adjusted as to be used both as a plumb and level, and so as to show any deviation from a horizontal or perpendicular line, and the amount of such deviation, both in degrees and in the lengths of the sines of the corresponding arcs, to any fixed radius.

To enable others skilled in the art to make and use my invention, I will proceed to describe its construction and mode of operation.

I make a frame of rectangular shape, consisting of the upper and lower parallel bars, $a$ $a'$, connected by the uprights $z\ z'$, and with or without the supports $b\ b$. At or near the middle of the rectangular figure formed by these bars I make a circular frame, $c$, inclosing a box, $c'$, on the inner face of which are the graduated scales $d\ e\ f\ g$, indicating the first, second, third, and fourth quadrants, respectively, into which the box is divided. The first quadrant, $d$, is graduated both ways to degrees, minutes, and seconds, and the remaining three quadrants are graduated for linear measurements, to be used in the manner and for the purposes hereinafter to be set forth. On the front and rear faces of the box $c$ are caps $h$, cut away around their outer edge so as to uncover the graduated scales, except at the straps $h'$, by which they are attached to the box $c'$. At the centers of the caps $h$ are bearings $i$, of agate or other hard substance, in which is suspended the axis $o$, usually of hardened steel, from which the index-fingers $d'\ e'\ f'\ g'$ extend radially out at right angles to each other, and sufficiently near to the scales to enable the correct readings to be taken off. One of the index-fingers, $f'$, is loaded with a weight, $l$, to keep it and the opposite finger, $d'$, pointing vertically, and the other two fingers, $e'\ g'$, horizontally, whatever may be the position of the instrument. Of course the adjustments should be carefully made. The scales should form a circle as perfect as it is practicable to make or as the accuracy of the work to be done may require. The axis $o$ should be carefully hung at the center of such circle. The index-fingers should diverge at right angles to each other, and the graduation should be such that lines connecting the zero-points at the beginning and end of each quadrant would be parallel to one or the other of the sides $a$ or $z$ of the rectangle.

The mode of using the instrument described, then, is as follows: For leveling or finding the amount of deviation from a level, the instrument is rested by the side $a'$ or the supports $b$, if such are used, on the line, object, or place to be leveled. If the radial fingers indicate zero, of course the instrument stands on a level foundation. If the right-hand end be the higher, such fact is indicated by all the indexes, and the amount of such deviation from a level is shown in degrees and parts of a degree on the scale $d$ by the index $d'$, and the number of feet in such elevation in one hundred feet of distance; or, in other words, the sine of the corresponding arc to a radius of one hundred feet is shown on the scale $f$ in the third quadrant by the index $f'$. If the left-hand end of the instrument be the higher, the amount of the deviation is indicated in degrees by the index $e'$ on the scale of the first quadrant, $d$, and the sine of the corresponding arc is read from the scale of the second quadrant, $e$, by the index $f'$.

To ascertain if a line or object be plumb, I place against it either of the parallel bars $a$ or $a'$, and take off the readings substantially as before. The angle of deflection, if it be not perfectly plumb, will be indicated by the proper index on the scale of the quadrant $d$, and the number of inches of deflection to a foot, or the sine of the arc, as before set forth, to a radius of one foot, will be shown by the upper vertical index on one of the quadrants, $f$ or $g$, according to the direction of the deflection.

My instrument thus combines the uses of a plumb, level, and clinometer, the zero-points indicating no deflection, and the deflection or deviation, if any, being indicated by the readings, both in circular and linear measurement.

I do not limit myself in my invention to any particular arrangement of the scales described. The scale $d$ may be placed in any other quadrant, at pleasure, and the scales of the other quadrants may be graduated to give the sines of the corresponding arcs to other radii than those named above. Also, two or more scales of graduation may be arranged in one quadrant, and by arranging a number of scales in one quadrant the number of index-fingers may be proportionally reduced.

The instrument described has many advantages over the instruments commonly employed for such uses. Fluctuations of temperature, however great, do not lessen its accuracy, since the scales being a complete circle, their position relative to the index-fingers is not affected by expansion and contraction. The bars $a$ $a'$ and $z$ $z'$ will always remain parallel, whatever be the temperature. The upper bar, $a$, being straight, the instrument is useful for most of the purposes for which a transit is commonly employed. It is small and light, so as to be easily carried about, can be used on any kind of a tripod or on a post, fence, or other convenient support, and is not liable to get out of order. The index-fingers and graduated scales are protected from injury by the caps $h$ and the projecting sides of the box $c'$ or frame $c$. The instrument is made almost wholly of metal, so as to be both strong and durable. It is easily used, accurate in its results, and applicable to plumbing and leveling in every department of mechanics and civil engineering.

What I claim as my invention, and desire to secure by Letters Patent, is—

A combined clinometer, plumb, and level, having a vertical circular box, with an arrangement of scales, so graduated as to give, in connection with one or more index-fingers, the amount of deflection of an object from a vertical or horizontal position in both circular and linear measurement, substantially as above set forth.

In testimony whereof I, the said JOHN L. L. KNOX, have hereunto set my hand.

JNO. L. L. KNOX.

Witnesses:
    W. BAKEWELL,
    W. F. GRAHAM.